United States Patent
Hashimoto et al.

(10) Patent No.: US 7,077,772 B2
(45) Date of Patent: *Jul. 18, 2006

(54) TENSIONER

(75) Inventors: Hiroshi Hashimoto, Osaka (JP); Osamu Yoshida, Osaka (JP); Masaki Kato, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 136 days.

This patent is subject to a terminal disclaimer.

(21) Appl. No.: 10/679,643

(22) Filed: Oct. 6, 2003

(65) Prior Publication Data

US 2004/0092348 A1 May 13, 2004

(30) Foreign Application Priority Data

Nov. 12, 2002 (JP) .............................. 2002-328626

(51) Int. Cl.
*F16H 7/08* (2006.01)
(52) U.S. Cl. ..................................... 474/109
(58) Field of Classification Search ................ 474/101, 474/109, 110, 113, 117, 119
See application file for complete search history.

(56) References Cited

U.S. PATENT DOCUMENTS

| | | | | |
|---|---|---|---|---|
| 5,746,673 | A * | 5/1998 | Polster et al. | 474/101 |
| 5,913,742 | A * | 6/1999 | Nakamura et al. | 474/110 |
| 6,685,587 | B1* | 2/2004 | Rossato et al. | 474/109 |
| 6,808,466 | B1* | 10/2004 | Yoshida et al. | 474/110 |
| 6,811,505 | B1* | 11/2004 | Hashimoto et al. | 474/110 |
| 2002/0142871 | A1* | 10/2002 | Namie et al. | 474/110 |
| 2004/0092350 | A1* | 5/2004 | Hashimoto et al. | 474/110 |
| 2005/0090342 | A1* | 4/2005 | Yoshida | 474/101 |

FOREIGN PATENT DOCUMENTS

| | | |
|---|---|---|
| EP | 1223364 A1 | 7/2002 |
| JP | 11-223252 | 8/1999 |
| JP | 2002-286104 | 10/2002 |
| WO | WO 03/038306 A1 | 5/2003 |

* cited by examiner

*Primary Examiner*—Vicky A. Johnson
(74) *Attorney, Agent, or Firm*—Woodling, Krost and Rust

(57) ABSTRACT

A tensioner, in which an outer body and an inner body, which can deal with a tensioner mounting form required by various engines and a tension-imparting function, can be assembled. The inner body and a movement backward preventing mechanism, which form an inner body unit, can be unitized in a shape by which press-fitting and assembling is easy, and its efficient assembling production can be performed. A body 22 of a tensioner 21 is composed of outer and inner bodies 23 and 24 of different members. The outer body 23 is provided with a tensioner mounting means and an inner body fitting hole 23a. The inner body 24 is provided with a plunger accommodating hole 24a into which a plunger 26 biased by a compression spring 27 was slidably fitted, and a movement backward preventing mechanism 32 for preventing the backward movement of the plunger 26 is incorporated into the inner body 24. The movement backward preventing mechanism 32 comprises a rack 26b formed on a part of the outer circumference of the plunger 26, a pawl body 32b pivotably supported with a pivot shaft 32a in a cutaway groove formed on a front end of the inner body 24, and a spring 31c, which biases a pawl of the pawl body 32b so that the pawl engages the rack 26b. An inner body side unit 33 composed of at least the inner body 24, the movement backward preventing mechanism 32, the compression spring 27 and the plunger 26, is adapted to be press-fitted and fixed into the inner body fitting hole 23a of the outer body 23.

2 Claims, 7 Drawing Sheets

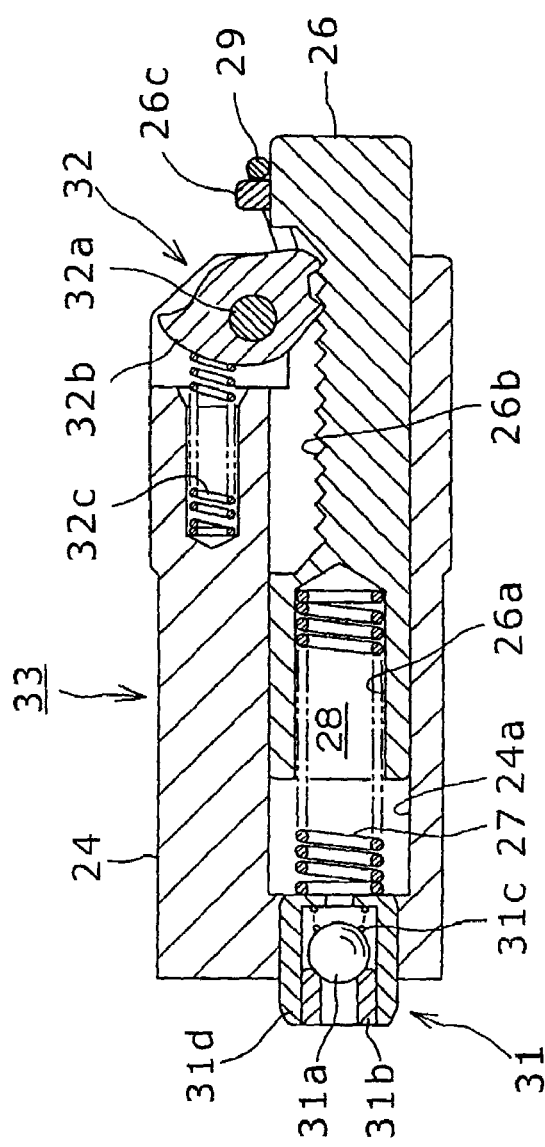
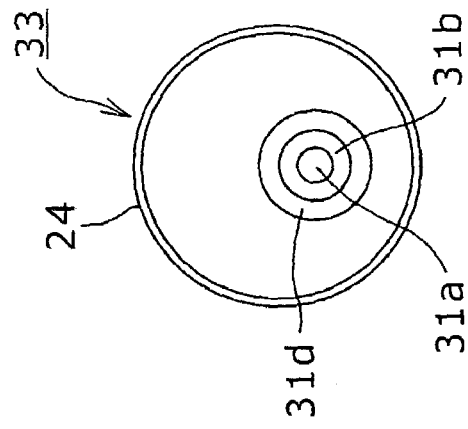

TENSIONER

This application claims the benefit of Japanese Patent Application 2002-328626 filed Nov. 12, 2002.

TECHNICAL FIELD TO WHICH THE INVENTION PERTAINS

The present invention relates to a tensioner used for imparting proper tension to a wrapping transmission member such as an endless belt or chain or the like.

RELATED ART

A tensioner has been used for imparting proper tension to a wrapping transmission member such as a timing chain, a timing belt or the like, which is used in an engine of an automobile.

Referring to FIGS. 6 and 7, a drive system for a timing chain used in an engine of an automobile will be described. Between a driving side sprocket 101 mounted on a crankshaft of the engine and driven side sprockets 102 mounted on camshafts is being wrapped a timing chain 103 so as to travel in a direction of the arrow. A tensioned side of the timing chain 103 is guided by a guide 104, and a loosened side thereof is guided by a lever 105. Further, in a drive system shown in FIG. 6, a tensioner 1 shown in FIG. 8 is mounted on an end wall 106 of a cylinder block by bolts. Said lever 105 is pressed by the tensioner 1 so that it imparts proper tension to the timing chain 103. A tensioner 21 shown in FIG. 6 is called as an inside mount type from the viewpoint of its mounting form. Further, in a drive system shown in FIG. 7, a tensioner 1' is mounted on a protruded wall 107 in a cylinder block by bolts. A lever 105 is pressed by the tensioner 1' so that proper tension is imparted to the timing chain 103. The tensioner 1' is called as so-called an outside mount type from the viewpoint of its mounting form.

FIG. 8 shows one example of a conventional tensioner. A tensioner 1 shown in FIG. 8 is a hydraulic tensioner comprising: a body 2 including a plunger accommodating hole 2*a*, mounting holes 2*b*, and an oil supply hole; a plunger 6 having an one end opened hollow portion 6*a* and slidably fitted into the plunger accommodating hole 2*a*; a compression spring 7 disposed in the hollow portion 6*a* and biasing the plunger 6 in the protruding direction; a pressure oil chamber formed of the plunger accommodating hole 2*a* and the hollow portion 6*a*; a check valve 11 mounted on a bottom portion in the plunger accommodating hole 2*a*; and a backing preventing mechanism 12 for preventing the backing of the plunger 6 provided on a front end of the body 2.

Further, in hydraulic plastic tensioners whose bodies were formed of plastic, there is known a tensioner comprising a metallic cylinder fitted into a circular hole formed in the body, a plunger inserted into the cylinder so that the front end portion protrudes from the body by a compression spring provided in the cylinder, a pressure oil chamber formed between the interior of the plunger and the cylinder, a check valve mechanism which allows the flow of oil into the pressure oil chamber but blocks backflow, and the like (refer to Japanese Patent Reference 1). Japanese Patent Reference 1, Japanese Patent Laid-open Publication No. 2002-286104 (on page 2, column 1, lines 1 to 10, FIGS. 1 to 5 and FIG. 7).

Alternatively, in liquid pressure tensioners for a power transmitting chain disposed between rotating members, there is known a tensioner comprising a housing having a hole, a sleeve member having inner and outer surfaces and accommodated in said hole, a hollow piston having inner and outer surfaces and slidably accommodated inside said sleeve member, and a piston spring, which biases said piston toward said power transmitting chain, in which the inner surface of said sleeve member and the inner surface of said piston are arranged to form a fluid chamber, said fluid chamber is provided to communicate with a fluid source, said housing is made of plastic formed by an injection molding process and said sleeve member is disposed in said housing by an insert forming process (refer to for example Japanese Patent Reference 2).

Japanese Patent Reference, Japanese Patent Laid-open Publication No. Hei 11-223252 (on page 2, column 1, line 1 through on page 2, column 2, line 13, FIGS. 1 to 7).

Problems to be Solved by the Invention

Tensioners come in various types. That is, from the viewpoints of mounting forms they have an inside mount type and an outside mount type. Alternatively, from the viewpoints of tension-imparting function, there are various types such as a simple spring type, a hydraulic type, a combination of the hydraulic type and a mechanical type, and the like. The conventional tensioner shown in FIG. 8, the tensioner disclosed in the above-mentioned Japanese Patent Reference 1 (Japanese Patent Laid-open Publication No. 2002-286104) and the tensioner disclosed in the above-mentioned Japanese Patent Reference 2 (Japanese Patent Laid-open Publication No. Hei 11-223252) are combinations of a hydraulic type and a mechanical type. In these tensioners the position of a mounting hole formed in the body (housing) and the position of an oil supply hole are determined by the requirement of each engine. Therefore, when requirements of engines are different, the entire tensioner including the body (housing) must be newly produced. In such a case, separate working and assembling lines are needed for every individual tensioner. Added equipment cost and factory space are necessary when assembly lines for new tensioners start up.

Accordingly, the object of the present invention is to solve the above-mentioned problems and to provide a tensioner, in which an outer body and an inner body, which can deal with a tensioner mounting form required by various engines and a tension-imparting function, can be assembled, the inner body and a movement backward preventing mechanism, which form an inner body side unit, can be unitized in a shape by which press-fitting and assembling is easy, and its efficient assembling production can be performed.

Means for Solving the Problems

To solve the above-mentioned problems a tensioner used for imparting proper tension to a trailing transmission member, is characterized in that a body of said tensioner is composed of outer and inner bodies of different members; said outer body is provided with a tensioner mounting means and an inner body fitting hole; said inner body is provided with a plunger accommodating hole into which a plunger biased by a compression spring was slidably fitted, and a movement backward preventing mechanism for preventing the backward movement of said plunger is incorporated into said inner body; said movement backward preventing mechanism comprises a rack formed on a part of the outer circumference of the plunger, a pawl body pivotably supported with a pivot shaft in a cutaway groove formed on a front end of said inner body, and a spring, which biases a pawl of said pawl body so that the pawl engages the rack; and an inner body side unit composed of at least said inner body, said movement backward preventing mechanism, said compression spring and said plunger are adapted to be press-fitted and fixed into said inner body fitting hole of said outer body.

Further, the above-mentioned problems are solved by that fact that the tensioner is characterized in that said outer body is made of plastic.

Since the portion having a tensioner imparting function is unitized on an inner body side, the inner body and the movement backward preventing mechanism forming an inner body side unit can be unitized in a form, which is easy to press-fit and assemble, and the working and assembly lines are unitized so that the reduction of equipment cost and space due to the commonality of equipment can be attained. Further, since different portions in the individual tensioners (for example, mounting hole, mounting surface, oil supply hole and the like) are formed in the outer body, tensioners including tensioner forms required from various engines can be efficiently produced by fixing the inner body and the outer body, which form an inner body side unit.

The outer body is made of plastic. Thus, after the outer body was injection-molded, an inner body forming an inner body side unit can be easily press-fitted and fixed into an inner body fitting hole for the outer body by heat welding or the like without working. Accordingly, even if a simple installation is provided in even a place other than a factory, the assembling of the unit and the outer body can be performed.

The invention will be better understood when reference is made to the BRIEF DESCRIPTION OF THE DRAWINGS, DETAILED DESCRIPTION OF THE INVENTION and CLAIMS which follow hereinbelow.

BRIEF DESCRIPTION OF THE DRAWINGS

FIG. 4 is an inner body side unit forming the tensioner shown in FIG. 1, particularly, (A) is a left end view and (B) is a cross-sectional.

A better understanding of the invention will be had when reference is made to the DETAILED DESCRIPTION OF THE INVENTION and CLAIMS which follow hereinbelow.

DETAILED DESCRIPTION OF THE INVENTION

Embodiments of the Invention

Figure 1:
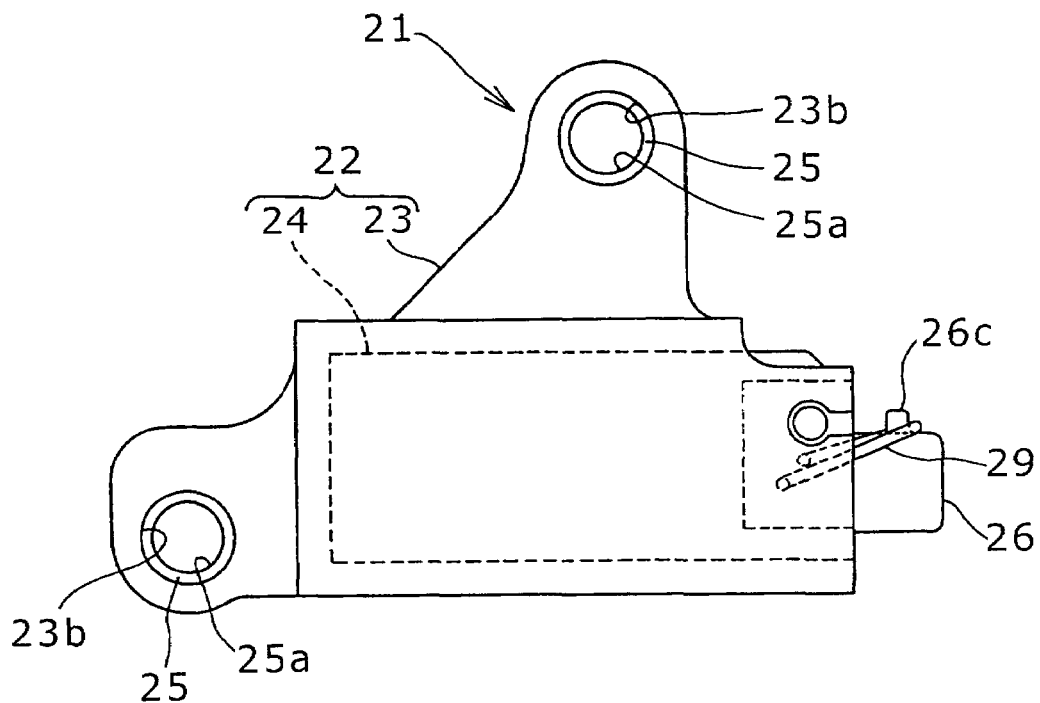
FIG. 1 is a front view of a tensioner according to an embodiment of the present invention.
Figure 2:
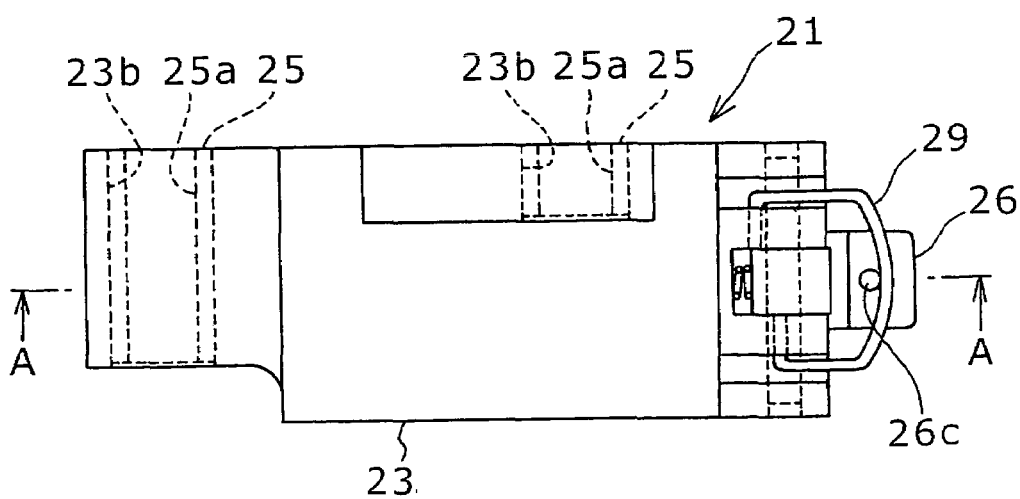
FIG. 2 is a plan view of the tensioner shown in FIG. 1.
Figure 3:
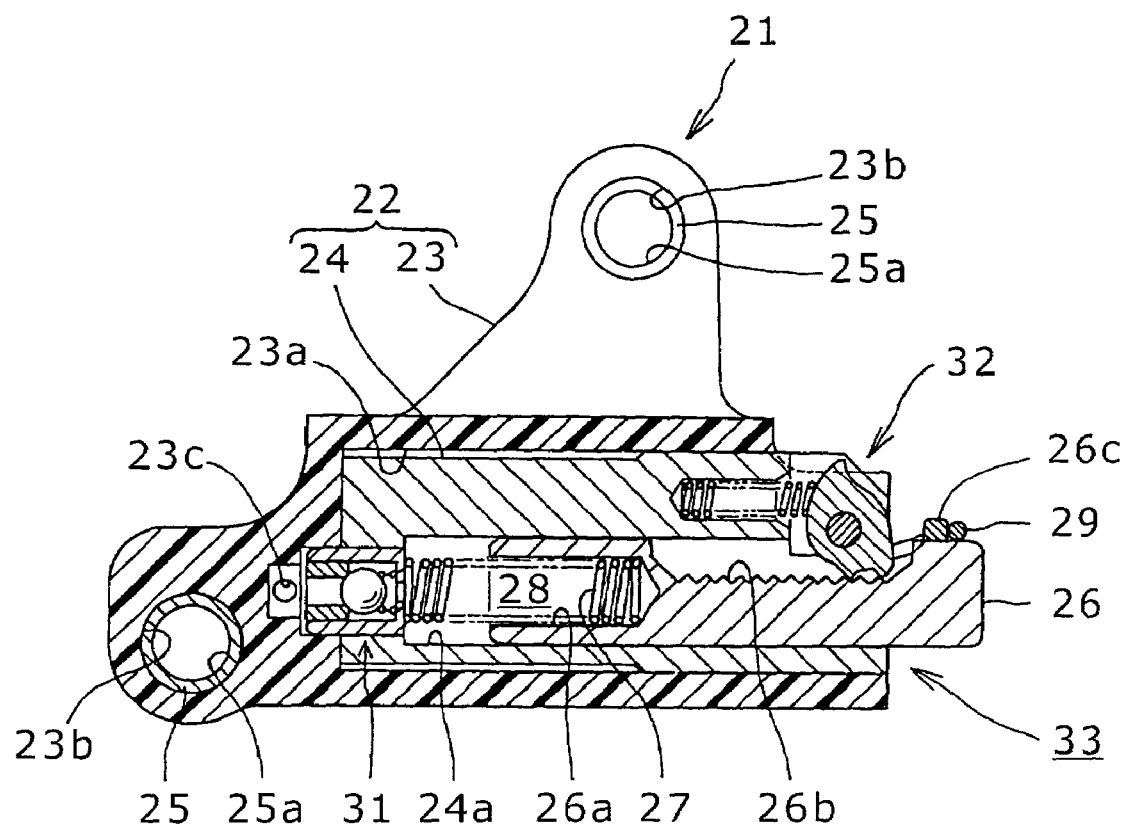
FIG. 3 is an A—A cross-sectional view in FIG. 2.
Figure 5:
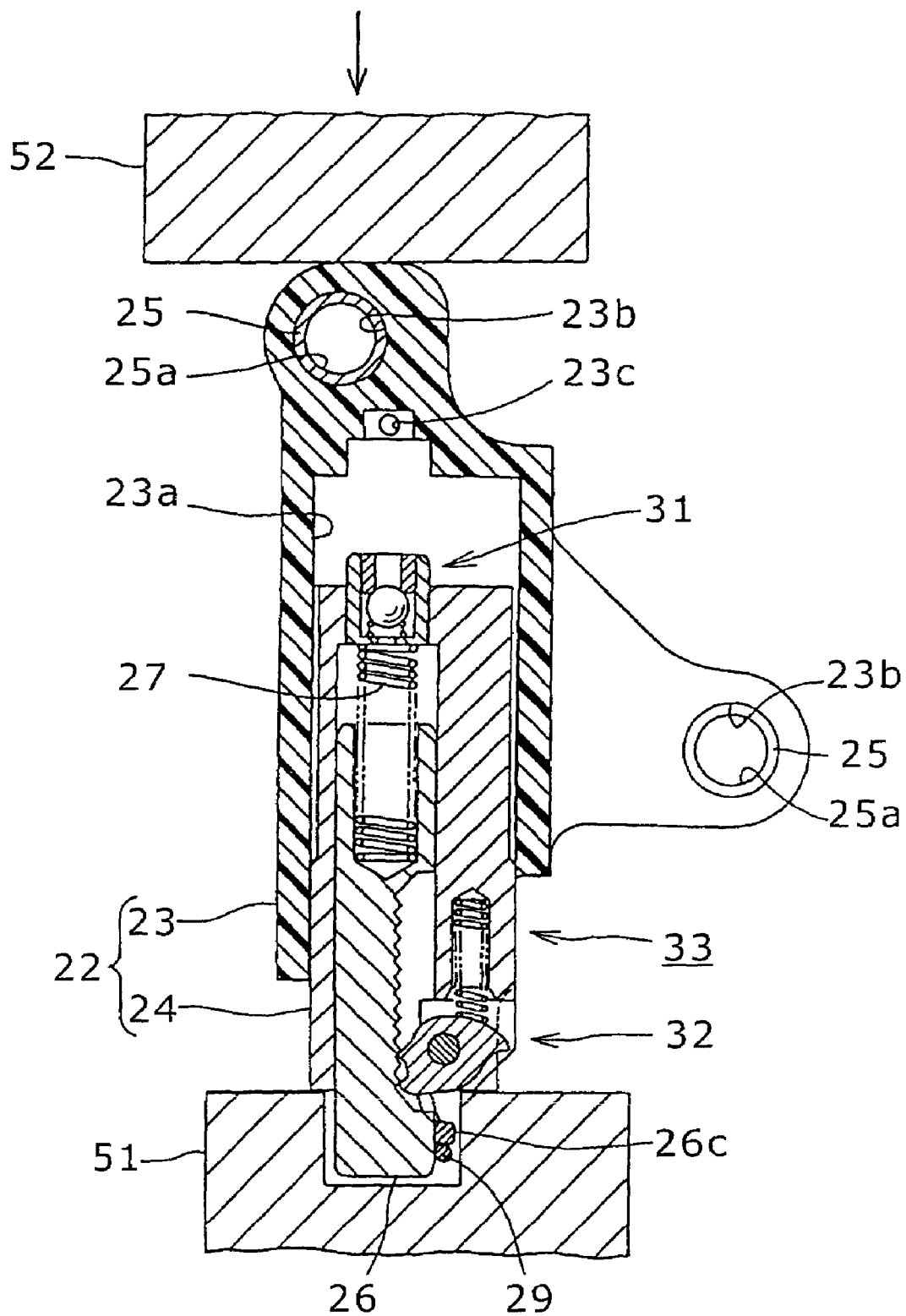
FIG. 5 is a cross-sectional view showing a process of incorporating an inner body side unit to an outer body of the tensioner shown in FIG. 1.
Figure 6:
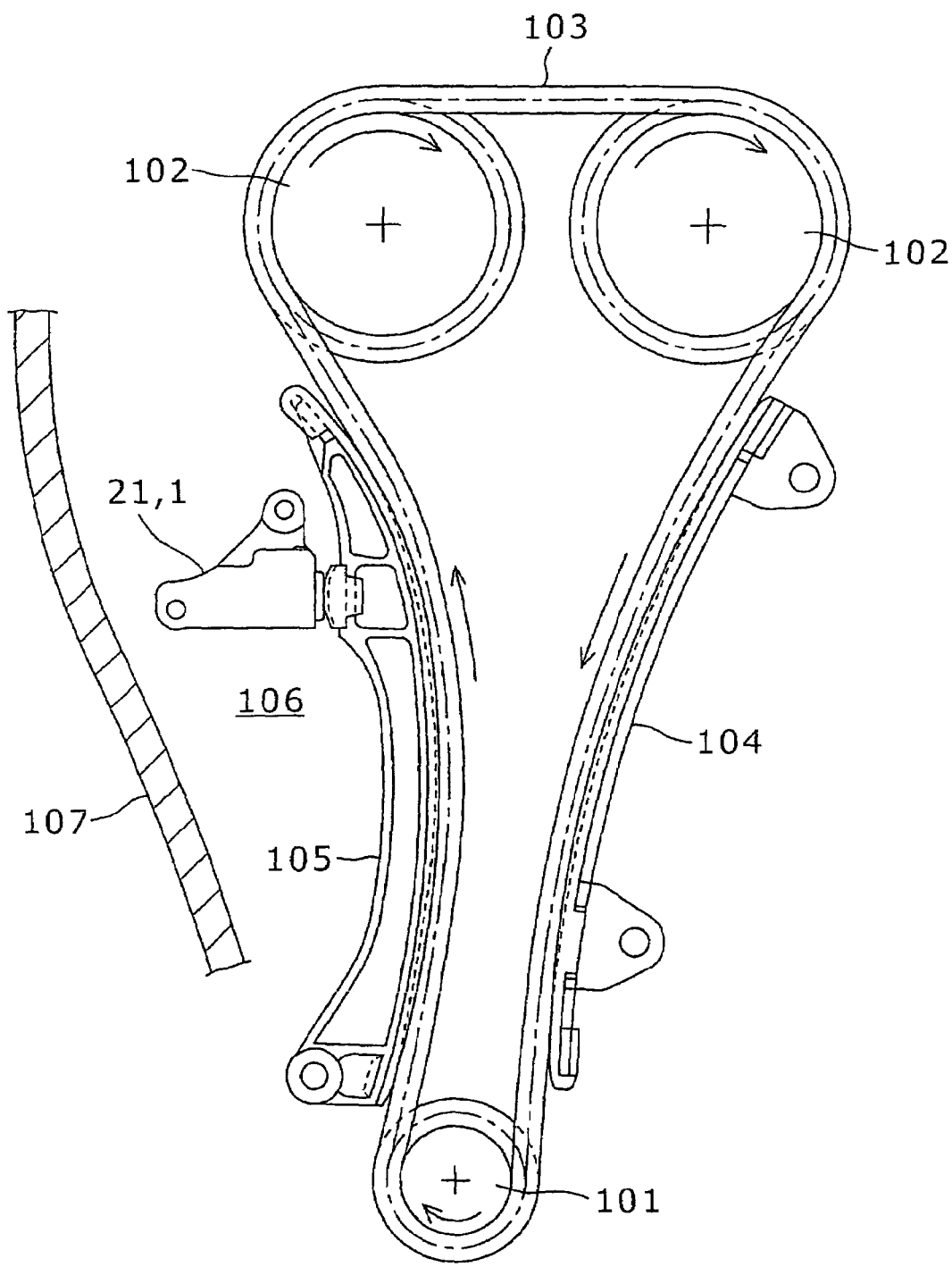
FIG. 6 is a schematic view showing an example of a tensioner mounting form in a drive system for a timing chain used in an automobile engine.
Figure 7:
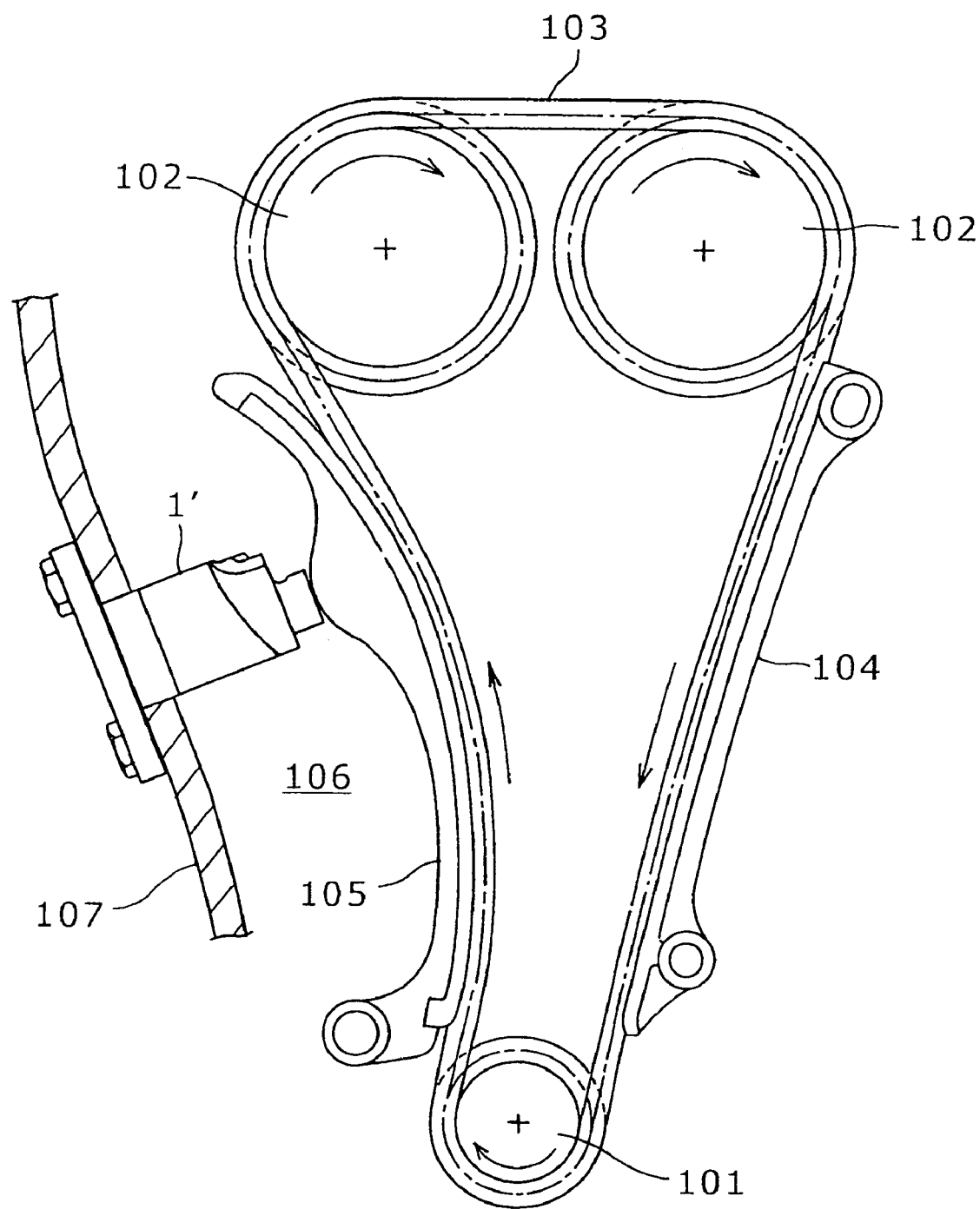
FIG. 7 is a schematic view showing another example of a tensioner mounting form in a drive system for a timing chain used in an automobile engine
Figure 8:
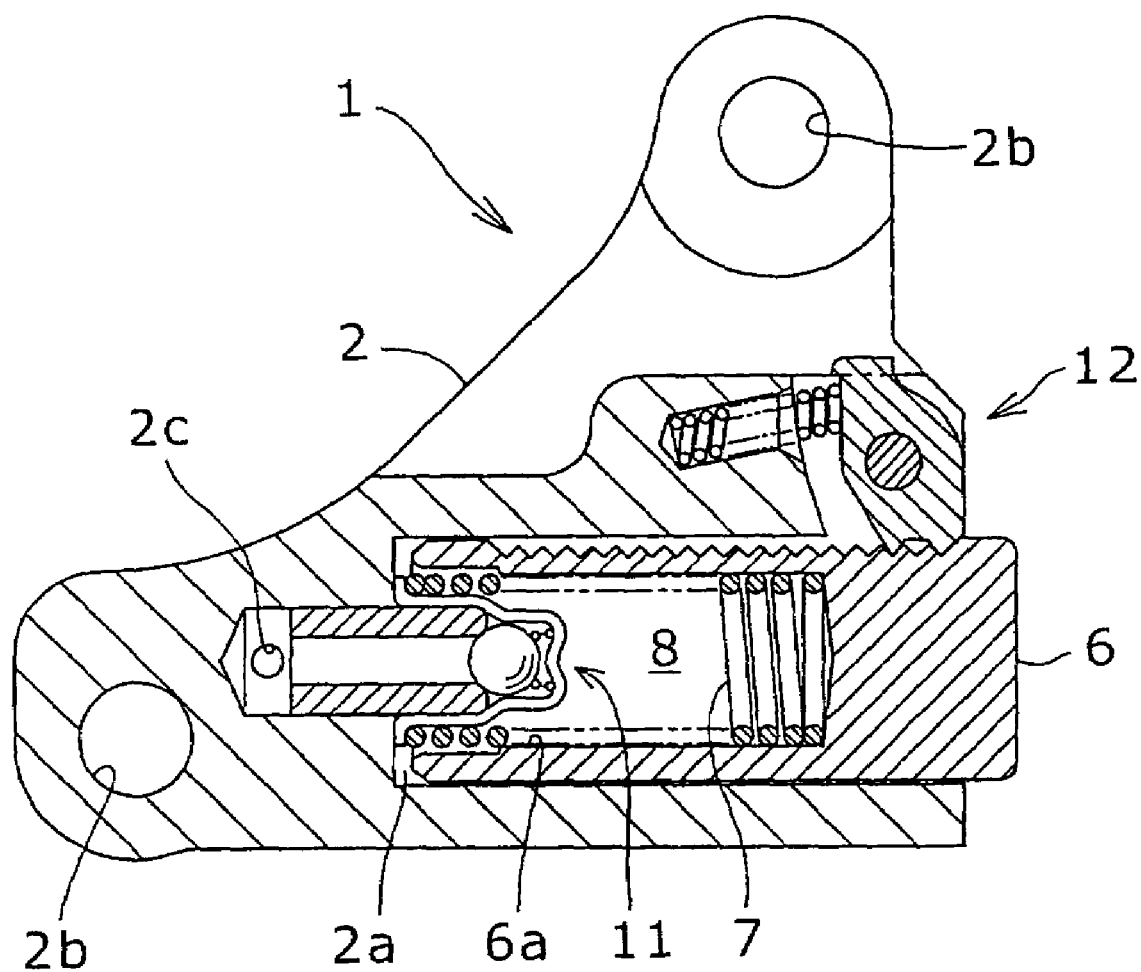
FIG. 8 is a cross-sectional view showing one example of a conventional tensioner.

Preferable embodiments of the present invention will now be described with reference to drawings. FIG. 1 is a front view of a tensioner, which is one Example, according to an embodiment of the present invention. FIG. 2 is a plan view of the tensioner shown in FIG. 1. FIG. 3 is the A—A cross-sectional view in FIG. 2. FIG. 4 shows an inner body side unit forming the tensioner shown in FIG. 1, and particularly, (A) is a left end view and (B) is a cross-sectional view. FIG. 5 is a cross-sectional view showing a process of incorporating an inner body side unit into the outer body of the tensioner shown in FIG. 1.

First, in a tensioner 21, which is an Example, shown in FIGS. 1 to 3, the body 22 of the tensioner 21 comprises an outer body 23 and an inner body 24, which are formed of different members respectively.

The outer body is made of plastic and is molded by an injection molding process. The outer body 23 includes an inner body fitting hole 23a, bushing mounting holes 23b and an oil supply hole 23c. To each of the bushing holes 23b is press-fitted and fixed a bushing 25 having a mounting hole 25a by ultrasonic welding, which will be described later. Further, the bushing 25 having the mounting hole 25a is made of plastic and forms a tensioner mounting means for mounting the tensioner 21 on an end wall 106 of a cylinder block by bolts.

The inner body 24 is made of metal such as an aluminum alloy or the like and is formed in a cylindrical shape by a die casting process. The inner body 24 includes a plunger accommodating hole 24a, and in this plunger accommodating hole 24a is slidably fitted into a plunger 26. In this plunger 26 is formed an open ended hollow portion 26a, and in this hollow portion 26a is accommodated a compression spring 27, which biases the plunger 26 in the protruding direction. Then, the plunger accommodating hole 24a and the hollow portion 26a form a pressure oil chamber 28.

Further, a bottom portion of the plunger accommodating hole 24a in the inner body 24 includes a check valve 31, as shown in FIG. 3. The check valve 31 comprises a ball 31a, a seat 31b on which the ball 31a is seated, a spring 31c, which biases the ball 31a and a retainer 31d, which supports the spring 31c as shown in FIG. 4. The seat 31b is press-fitted into an inner circumferential surface of the retainer 31d, and the retainer 31d is press-fitted into the bottom portion of the plunger accommodating hole 24a. Further, an end of the compression spring 27, which biases the plunger 26 in the protruding direction is supported by an end surface of the retainer 31d.

A front end of the inner body 24 is provided with a movement-backward preventing mechanism 32, which prevents the movement backward of the plunger 26. The movement-backward preventing mechanism 32 comprises a rack 26b formed a portion of the outer circumference of the plunger 26, a pawl body 32b pivotally supported by a pivot shaft 32a in a cutout groove formed in the front end of the inner body 24, and a spring 32c, which biases so that the pawl of the pawl body 32b locks the rack 26b. This movement-backward preventing mechanism 32 has functions of allowing the movement forward (protrusion) of the plunger 26 and of regulating the movement backward, which exceeds a range of the backlash. Further, to the front end of the inner body 24 is rotatably attached a stopper 29 of a wire working spring, which stops the protrusion of the plunger 26 in a state before mounting the tensioner 21. Thus, this engagement of the stopper with a pin 26c prevents the plunger 26 from protruding.

As described above, the plunger 26, the compression spring 27, the check valve 31 and the movement-backward preventing mechanism 32 are all incorporated into the inner body 24. Then, the inner body 24, the plunger 26, the compression 27, the check valve 31, and the movement-backward preventing mechanism 32 form an inner body side unit 33. Thus, this inner body side unit 33 has a proper tension imparting function, which imparts proper tension to a timing chain 103.

Next, the press-fitting and assembling of the tensioner 21, which is the Example, shown in FIGS. 1 to 3 will be described. First, the inner body 24, the plunger 26, the compression 27, the check valve 31 and the movement-backward preventing mechanism 32 are assembled with each other to complete the inner body side unit 33. Then, the inner body side unit 33 is press-fitted into the outer body 23, and a press-fitted portion of the inner body fitting hole 23a in the outer body 23 is fused and softened to fix by an ultrasonic welding machine. That is, as shown in FIG. 5, the inner body 24 forming the inner body side unit 33 is disposed on a base of the ultrasonic welding machine and is secured thereto by a tool (not shown). Then, the inner body fitting hole 23a in the outer body 23 is inserted to the inner body 24 forming the inner body side unit 33. After that a horn of the ultrasonic welding machine is arranged on the top portion of the outer body 23. Then, a power supply, which activates the horn 52, is activated, and while generating ultrasonic vibration up and down in the horn 52, the front end surface of the horn 52 is pressed against the rear end surface (top surface) of the outer body 23. Then, while applying the pressing force in the direction of the arrow (FIG. 5) the inner body 24 is gradually press-fitted into the inner body fitting hole 23a in the outer body 23.

In this case frictional heat is generated at the contact portion that is the press-fitting portion between the inner body 24 and the inner body fitting hole 23a. Since the outer body is made of plastic, the press-fitting portion is fused and softened so that the inner body 24 is strongly press-fitted and fixed into the inner body fitting hole 23a.

In this case, it is preferable to previously knurl the press-fitting portion of the inner body 24, since the inner body 24 is strongly fixed.

It is noted that in the above-mentioned tensioner 21 of the example shown in FIG. 5, although the inner body 24 forming the inner body side unit 33 was disposed on the base 51 of the ultrasonic welding machine and the outer body 23 was arranged on the horn 52 side of the ultrasonic welding machine, the outer body 23 may be disposed on the base 51 and the inner body 24 forming the inner body side unit 33 may be arranged on the horn 52 side.

Further, the fixing of the inner body 24 into the inner body fitting hole 23a by heat welding can be performed by a process other than the ultrasonic welding. For example as the heat welding means the radio frequency induction heating can be utilized. That is when the inner body 24 is made of metal, it is surrounded by a radio frequency induction coil, so that the outer circumference of the inner body 24 is rapidly heated by radio frequency induction heating. Then the heated inner body 24 is press-fitted into the inner body fitting hole 23a. In this case as well, the inner circumferential surface of the inner body fitting hole 23a is fused and softened to heat weld by the heat of the inner body 24.

Although not shown, when a bushing 25 for mounting the tensioner 21 on an end wall of a cylinder block of the engine is fixed into the bushing-fitting hole 23, an ultrasonic welding machine can be also used. That is onto a base of the ultrasonic welding machine is fixed the outer body 23. Then, into the bushing mounting hole 23b of the outer body 23 is inserted the lower portion of the bushing 25, and on the top of the bushing 25 a horn of an ultrasonic welding machine is disposed. Then while generating ultrasonic vibration up and down, the front end surface of the horn is pressed against the top end surface of the bushing 25. Then while applying pressing force downward, the bushing is gradually press-fitted into the bushing mounting hole 23b of the outer body 23. In this case, frictional heat is generated at the contact surface, that is, the press-fitting portion between the bushing 25 and the bushing mounting hole 23b. Since the outer body 23 is made of plastic the press-fitting portion is fused and softened, so that the bushing 25 is strongly fixed into the bushing mounting hole 23b. In this case, it is preferable to previously knurl the press-fitting portion of the bushing 25, since the bushing 25 is strongly fixed.

It is noted that although in the above-mentioned example the outer body 23 was disposed on the base of the ultrasonic welding machine, the bushing 25 may be disposed on the base and the outer body 23 may be arranged on the horn side.

When the bushing 25 is press-fitted and fixed into the bushing mounting hole 23b of the outer body 23, the above-mentioned radio frequency induction heating can be also utilized as a heat welding means.

The above-described tensioner 21 is an inside mount type and is made of plastic. Further, the inner body side unit 33 is a combination of a hydraulic type and a mechanical type.

In the tensioners according to the present invention, a material of the outer body may be an aluminum alloy or an iron system. The unit can take a hydraulic type or spring type or the like if it has a proper tension imparting function. Further, the outer body uses different mounting means such as a mounting hole and the like in accordance with the inside mount type or the outside mount type. In the tensioner to which the present invention is applied, the unit has a proper tension imparting function, and the outer body forms different portions (for example, mounting hole, mounting surface, oil supply hole and the like).

It is noted that although in the above-described embodiments of the present invention, the press-fitting and fixing of the inner body 24 to the inner body fitting hole 23a and the press-fitting and fixing of the bushing 25 to the bushing mounting hole 23b are performed by heat welding, these press-fitting and fixing may be performed by fixing due to simple press-fitting.

It is noted that although in the present embodiments as a wrapping transmitting member, to which proper tension is imparted, the timing chain was described. However, in the inventions according to claims 1 and 2, as the wrapping transmitting member, to which proper tension is imparted, a chain other than the timing chain may be used, and a timing belt or the like may be used.

EFFECTS OF THE INVENTION

The inner body unit of the tensioner includes a tensioner imparting function provided by an inner body, a movement backward preventing mechanism, a check valve, a compression spring and a spring.

Further, since different portions in the individual tensioners (for example, mounting hole, mounting surface, oil supply hole and the like) are formed in the outer body, tensioners, which are capable of exhibiting tensioner mounting forms and tension imparting functions required by various engines can be efficiently produced by fixing the inner body and the outer body, which form a unit. Further, the outer body is made of plastic. Thus, after the outer body was injection-molded, an inner body forming an inner body side unit can be easily press-fitted and fixed into an inner body fitting hole for the outer body by heat welding or the like without working. Accordingly, even if a simple installation is provided in even a place other than a factory, the press-fitting and assembling of the inner body side unit and the outer body can be performed.

DESCRIPTION OF REFERENCE NUMERALS

21: Tensioner
22: Body
23: Outer body
23a: Inner body fitting hole
23b: Bushing-mounting hole
23c: Oil supply hole
24: Inner body
24a: Plunger accommodating hole
25: Bushing
25a: Mounting hole
26: Plunger
26a: Hollow portion
26b: Rack
25c: Pin
27: Compression spring
28: Pressure oil chamber
29: Stopper
31: Check valve
31a: Ball
31b: Seat
31c: Spring
31d: Retainer
32: Movement backward preventing mechanism
32a: Pivot shaft
32b: Pawl body
32c: Spring
33: Inner body side unit
51: Base
52: Horn
101: Driving side sprocket
102: Driven side sprocket
103: Timing chain (wrapping transmission member)
104: Guide
105: Lever
106: End wall of cylinder block
107: Protruded wall of cylinder block While the invention has been described herein by way of example only, those skilled in the art will recognize that certain changes and modifications may be made to the invention as described herein by way of example without departing from the spirit and scope of the appended claims.

The invention claimed is:

1. A tensioner used for imparting proper tension to a wrapping transmission member, comprising:
   an outer body and an inner body unit;
   said outer body is provided with a tensioner mounting means and an inner body unit fitting hole;
   said inner body unit comprises:
   an inner body;
   said inner body includes a plunger accommodating hole;
   a compression spring;
   a plunger engaging and imparting proper tension to said wrapping transmission member;
   said compression spring resides within said plunger accommodating hole of said inner body;
   said compression spring biasing said plunger;
   a movement backward preventing mechanism for preventing the backward movement of said plunger;
   said movement backward preventing mechanism comprising:
   said plunger including an outer circumference and said outer circumference of said plunger including a rack;
   said inner body including a front end;
   said front end of said inner body including a cutaway groove formed therein;
   a pawl body and a pivot shaft of said pawl body;
   said pawl body includes a pawl;
   said pivot shaft being affixed to said cutaway groove formed in said inner body;
   said pawl body being pivotally supported by said pivot shaft of said pawl body;
   a pawl spring; and,
   said pawl spring operating between said inner body biasing said pawl body and said pawl engages said rack; and, wherein,
   said inner body being press fitted and fixed into said inner body fitting hole of said outer body.

2. The tensioner according to claim 1, characterized in that said outer body is made of plastic.

* * * * *